United States Patent [19]
Collin et al.

[11] 3,985,544
[45] Oct. 12, 1976

[54] METHOD FOR SIMULTANEOUS COMBINED PRODUCTION OF ELECTRICAL ENERGY AND CRUDE IRON

[75] Inventors: Per Harald Collin, Falun; Folke Karl Evald Johansson, Borlange, both of Sweden

[73] Assignee: Stora Kopparbergs Bergslags Aktiebolag, Falun, Sweden

[22] Filed: July 31, 1974

[21] Appl. No.: 493,614

Related U.S. Application Data

[63] Continuation-in-part of Ser. No. 299,213, Oct. 10, 1972, abandoned.

[30] Foreign Application Priority Data

| | | |
|---|---|---|
| Nov. 1, 1971 | Sweden | 13891/71 |
| Apr. 5, 1972 | Sweden | 4352/72 |
| Apr. 21, 1972 | Sweden | 5211/72 |

[52] U.S. Cl. .................................. 75/11; 75/26
[51] Int. Cl.$^2$ .............................. C21C 5/52
[58] Field of Search .................. 75/11–13, 75/26, 33–38

[56] References Cited
UNITED STATES PATENTS

| | | | |
|---|---|---|---|
| 2,066,665 | 1/1937 | Baily | 75/11 |
| 2,742,353 | 4/1956 | Ogorzaly | 75/26 |
| 2,894,831 | 7/1959 | Old et al. | 75/13 |
| 3,150,961 | 9/1964 | Collin | 75/11 |
| 3,888,658 | 6/1975 | Shoupp et al. | 75/11 |

*Primary Examiner*—M. J. Andrews
*Attorney, Agent, or Firm*—Curtis, Morris & Safford

[57] ABSTRACT

The invention relates to a method of combined production of electrical energy and crude iron, comprising reducing iron oxides while keeping the temperature below the melting point of the crude iron during a pre-reduction and above said melting point during a final reduction. The pre-reduction is made by introducing carbonaceous material and the material containing iron oxides into a fluid bed containing solid carbonaceous material, producing reducing gases in the fluid bed by partial combustion of the carbonaceous material with air/or oxygen gas, pre-reducing the iron oxides by said reducing gases until the material has achieved a metallization degree of 30–80 %, most of the heat requirement of the pre-reduction being covered by said combustion. The pre-reduced material is finally reduced and molten by being brought into contact with carbon, and the heat requirement of this final reduction and melting process is covered by electric heating. A substantial part of the exhaust gases from the reduction operations is passed to a thermal power station to generate electrical power therein.

6 Claims, 5 Drawing Figures

METHOD FOR SIMULTANEOUS COMBINED PRODUCTION OF ELECTRICAL ENERGY AND CRUDE IRON

This application is a continuation-in-part of Ser. No. 299,213 filed Oct. 10, 1972 now abandoned.

The present invention relates to a method for simultaneous, combined production of electrical energy and crude iron from carbonaceous materials and grained materials containing iron oxides. By crude iron is meant in this connection carbonaceous iron melts containing 2–6 % carbon as well as the usual impurities and alloying substances from the raw materials used. By carbonaceous material is meant fuels and reducing agents containing carbon and hydrocarbons, for example coal, coke, oil or natural gas, or mixtures of two or more of these. By grained materials containing iron oxides is meant iron ore concentrate, calcined iron pyrites or other oxides of iron having a particle size of up to 10 mms.

According to the invention a simultaneous, combined production of electrical energy and crude iron is obtained from carbonaceous materials and grained materials containing iron oxides by means of a method comprising performing reduction of the iron oxides in two separate operations, pre- and final reduction, the temperature being kept below the melting point of the crude iron during the pre-reduction and above said melting point during the final reduction, introducing carbonaceous material and the material containing iron oxides into a fluidized bed containing solid carbonaceous material, producing reducing gases in the fluidized bed by partial combustion of the carbonaceous material with air/or oxygen gas, pre-reducing the iron oxides by said reducing gases until the material has achieved a metallization degree of 30–80 %, most of the heat requirement of the pre-reduction being covered by said combustion, finally reducing and smelting the product pre-reduced to a metallization degree of 30 to 80 % as defined above in said pre-reduction operation to produce crude iron by bringing it into contact with carbon while supplying heat, the heat requirement of the final reduction being substantially covered by electric heating, and the exhaust gases from the reduction operations are to a substantial extent conveyed directly to a thermal power station where the remaining energy contents of the gases (physical + chemical) are used to generate electrical power.

An important advantage of the method according to the invention is that it permits the direct use of inexpensive carbonaceous materials, such as, for example, oil and high-volatile coal, for the manufacture of crude iron. The conventional manufacture of crude iron in a blast furnace requires metallurgical coke, which, per unit of reduction capacity roughly costs twice as much as said inexpensive fuels which can be used according to the invention.

Another advantage of the invention is that the energy consumption per ton of crude iron manufactured is low. Only the heat losses due to radiation, etc. from the equipment are wasted since, due to the combination of the process with the generation of electrical energy, full use is made of all the exhaust gases.

Yet another advantage of the invention is that it permits the use of grained materials containing iron oxides. This is a considerable saving in costs in comparison with the methods (for example blast furnaces) which require agglomerated concentrates.

As will be shown in the following, the combination of the above advantages enables crude iron to be manufactured according to the invention at a cost which is about 30 % less than crude iron manufactured in blast furnaces. Added to this, the electrical power obtained at the same time as the crude iron according to the present method has a cost which can very well compete with the price of conventionally generated electric power.

According to the method of the invention the generation of electrical power in the thermal power station is combined in such a way with the manufacture of crude iron that gasification of the carbonaceous material which, in a thermal power station would take place in its combustion chamber, is located in the section for the manufacture of iron. Thus, without detriment to the economy, generous quantities of reducing agent can be used in the process. This means that the reduction can be performed in equipment of a technically simple nature as well as the exhaust gases from the reduction process being fully utilized to generate energy.

The invention will be further described and exemplified with reference to the accompanying drawings.

Figure 1:
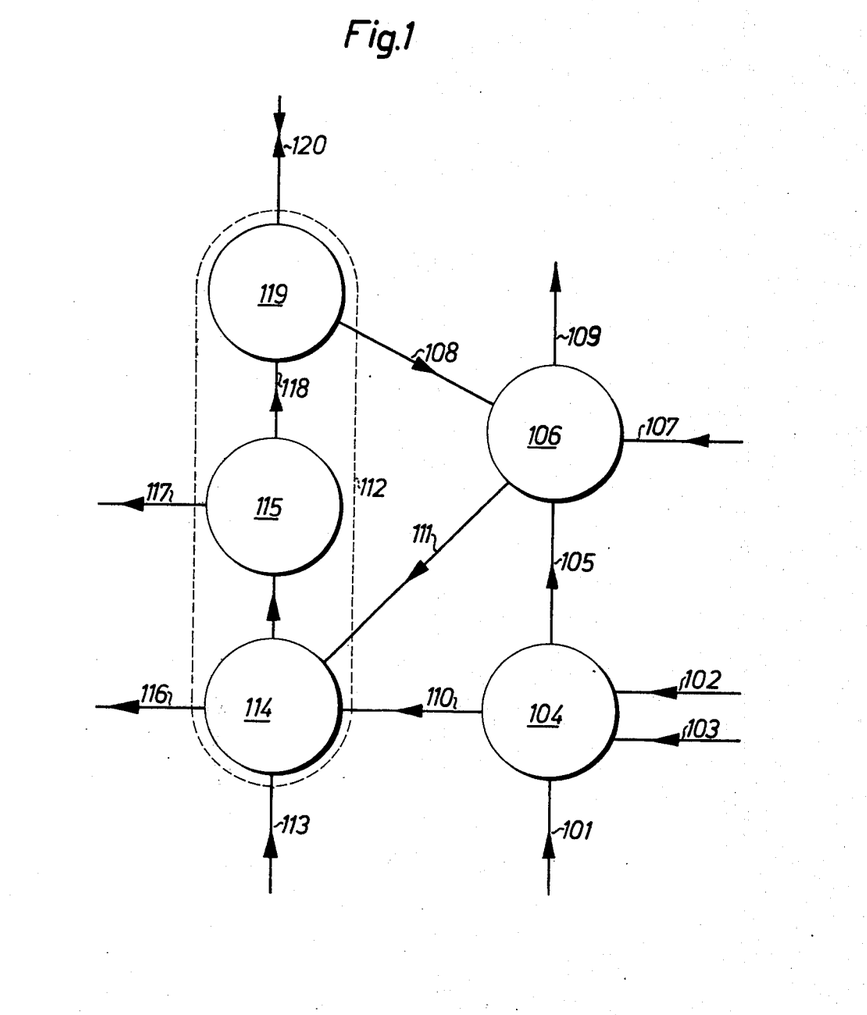
FIG. 1 illustrates the invention in the form of a flow sheet.

According to FIG. 1 material 101 containing iron oxides, carbonaceous material 102 and air 103 are conveyed to a pre-reduction operation 104 where a part of the carbonaceous material is converted to a reducing gas and to solid carbonaceous material by partial combustion. This reducing gas pre-reduces the material containing iron oxides which is then transferred 105 to a final reduction operation 106 where, eventually after the addition of more solid carbonaceous material 107 or removing of surplus of solid carbonaceous material and supply of electrical power 108, a molten crude iron 109 is obtained. The exhaust gases 110, 111 from the pre-reduction and from the final reduction are conveyed to a steam generator 114 in a thermal power station 112, where their energy content is converted to electrical energy, all or part 108 of which is returned to the final reduction zone 106. From the drawing it is clear that all carbonaceous material is supplied to the process for manufacturing crude iron where only a part of its energy content (combustion heat) is used for the production of crude iron whereas the rest, in the form of combustible gases 110, 111, is used by being burned with air 113 in the steam generator 114 and is converted by means of a turbine-generator to electrical energy. Flue gases 116 are thus emitted from the steam generator 114 and their heat can be used to preheat the air 103 for the pre-reduction process 104. Some of the energy is lost with the cooling water 117 from the turbine. This may possibly be used for heating of houses. The electrical energy 118 obtained is transferred via a switchboard 119 to the final reduction process 106. The switchboard is connected to a power network 120 so that an excess or lack of power can be compensated by feeding power to or from the power network.

Figure 2:
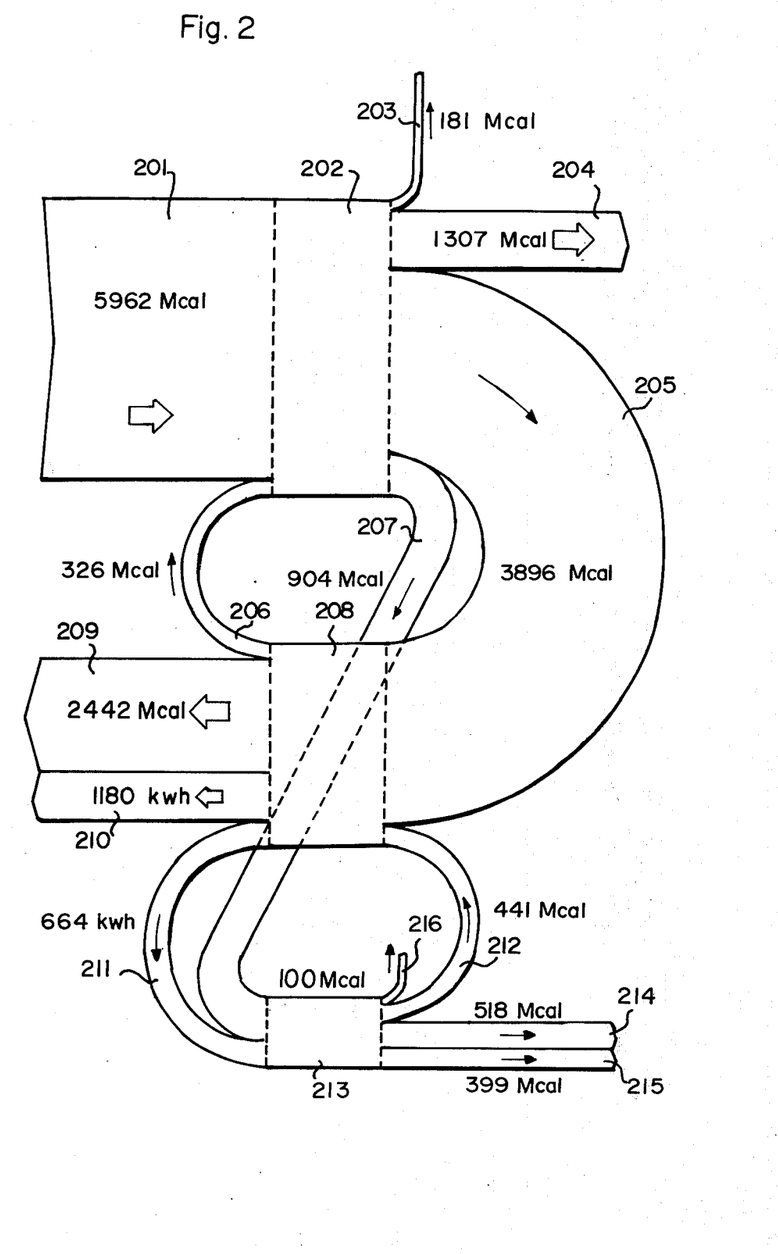
FIG. 2 illustrates the energy balance for a specific application of the invention.

FIG. 2 illustrates the energy balance for a specific application of the invention. Here magnetite concentrates containing 67.7 % Fe are reduced with oil or highvolatile coal in a pre-reduction operation 202. The carbonaceous material is added, see 201, in a quantity corresponding to 5962 Mcal, per ton of Fe of crude iron. The pre-reduction process is continued to 70 % of degree of metallization, which means that 70 % of the iron content of the product is metallic iron. During the pre-reduction process a heat loss 203 of 181 Mcal occurs. The energy absorption during the pre-reduction requires an amount of heat 204 corresponding to 1307 Mcal. The exhaust gases from the pre-reduction contain a heat quantity 205 of 3896 Mcal. The pre-reduced product mixed with solid carbonaceous material which has an enthalpy 207 of 904 Mcal, is then finally reduced in a final reduction operation 213.

A heat quantity 212 of 441 Mcal leaves the final reduction 213 in the form of exhaust gases, a heat quantity 214 of 518 Mcal in the form of energy absorption in the final reduction, a heat quantity 215 of 399 Mcal in the form of enthalpy of the crude iron and slag and a heat quantity 216 of 100 Mcal in the form of losses. A heat quantity 211 corresponding to 644 kWh is supplied to the final reduction 213 in the form of electrical energy.

The exhaust heat 205 from the pre-reduction is used in a thermal power station 208, which also receives the heat quantity 212 from the final reduction. A portion 211 of the electric energy generated is used for the final reduction 213, whereas the rest 210 constitutes excess energy which can be sold. A heat quantity 209 is lost with the flue gas and cooling water and a heat quantity 206 is used to preheat air for the pre-reduction process 202.

It is clear from the diagram that 2.2 · 1180 = 2596 Mcal of the combustion heat (5962 Mcal/t Fe) of the carbonaceous material has been used for the production of excess electric energy and the remaining 3366 Mcal for the production of crude iron. The reduction process requires 1307 + 518 Mcal and the enthalpy of the iron and slag 399 Mcal, a total of 2224 Mcal. This means a 66 % thermal efficiency in the production of crude iron.

Using the same raw materials as for FIG. 2 (coal, oil) and acquiring the same products (crude iron and electric power), the efficiency of energy supplied in a modern blast furnace with coke oven and with a power station to utilize the gas is approximately 50–55 %, i.e. poorer than the method according to the invention. There is also the difference between the two methods that the method according to the invention can be performed using inexpensive carbonaceous materials. If the coke could be replaced, calorie for calorie, by oil in a blast furnace, the fuel costs would drop by about 70 %. A considerable proportion of this saving in costs can be realized using the method according to the invention, but a certain amount is lost because of the conversion to electric energy necessary in connection with the electrical heating in the final reduction. Including the advantage, from a cost point of view, over the blast furnace of being able to use non-agglomerated Fe raw material, the cost of the crude iron produced according to the embodiment of the invention illustrated in FIG. 2 is 30 % lower than for crude iron produced by the blast furnace method.

According to the method of the invention, the reduction of the material containing iron oxides is performed in two separate operations: pre-reduction and final reduction, the temperature during the pre-reduction being lower than the melting point of the metal and during the final reduction higher than the melting point of the metal. The further the pre-reduction is carried out, i.e. the higher the reduction degree of the pre-reduced product, the lower will be the amount of energy required in the form of electric heating for the final reduction and the greater in quantity and the richer in energy will the exhaust gases, reaching the thermal power station, be. According to the embodiment shown in FIG. 2 the exhaust gases produce 1824 kWh per ton of crude iron, with an energy consumption of 2200 kcal/kWh in the thermal power station and of 70 % degree of metallization in the pre-reduction product. For the final reduction 644 kWh are consumed, in view of which 1180 kWh per ton of crude iron can be used for sale and/or made use of in some other way in the steel plant.

Figure 3:
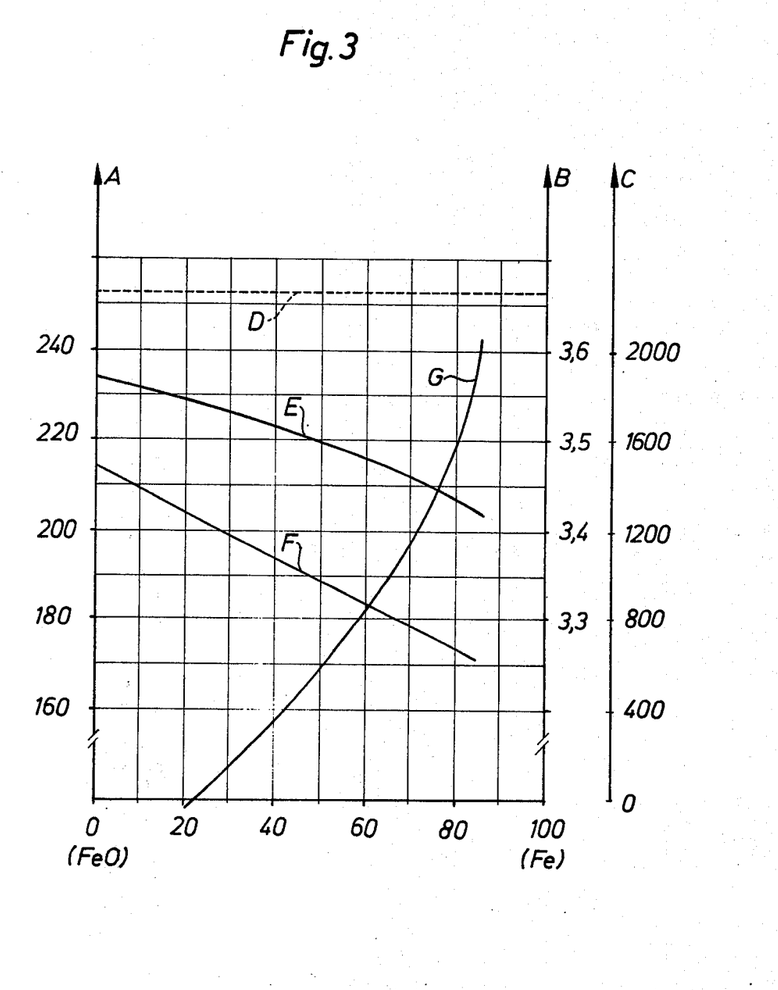
FIG. 3 shows the prime cost for crude iron and electrical power as a function of the degree of metallization.

The relationship between the prime cost of the molten crude iron and the degree of metallization at 0–85 % metallization in the pre-reduction product is clear from the diagram in FIG. 3 which refers to the embodiment of the invention described in FIG. 2. The diagram according to FIG. 3 shows the situation if 500,000 ton crude iron is produced per year. Ordinate A indicates Swedish Crowns per ton of crude iron. Ordinate B indicates ore per kWh of electric energy generated. Ordinate C illustrates kWh of excess electric energy generated per ton of crude iron. The abscissa illustrates the metallization degree. In addition to prime cost F of the crude iron, the diagram also shows the quantity G of excess electric energy and its cost E per unit. For the purpose of comparison the prime cost D of blast furnace crude iron is also shown. As is clear, the prime cost of the crude iron and the electric power decrease with increasing metallization degree in the pre-reduced product. It is also clear that the energy requirement for the final reduction and the production of electric power by means of the exhaust gases balances at about 25 % degree of metallization. At higher degrees of metallization electric power is obtained in rapidly increasing excess. The diagram in FIG. 3 clearly shows the importance from an economical point of view, of keeping the metallization degree in the pre-reduction product as high as possible.

The pre-reduction in fluid bed can be performed in several different ways while applying the invention.

The fine-grained material containing iron oxides is possibly pre-heated in a special step, functioning on the same principle as the pre-reduction step, but the preheating permits complete combustion of the fuel supplied.

When crude iron is being manufactured in accordance with the invention, the pre-reduction is performed in a fluid bed or a system of fluid beds by introducing carbonaceous material, grained material containing iron oxides, and fluidizing gas including air or oxygen gas into the fluid bed. The proportions of the materials introduced into the beds being controlled so that the bed always contains solid carbonaceous particles, preferably in an amount having at least the same volume as the iron oxide containing material in the bed. The solid carbon in the bed may be solid carbonaceous material introduced into the bed, or produced in the bed by coking of coal introduced as carbonaceous material, or by cracking of hydrocarbons introduced as carbonaceous material. Air or oxygen gas is introduced in an amount giving, by partial combustion of the carbonaceous material, a reducing gas in the fluid bed and covering, by said combustion, most of heat requirement of the pre-reduction. A part of the heat requirement of the pre-reduction may be covered by pre-heating in a separate equipment the materials introduced into the fluid bed. The solid carbonaceous particles in the bed prevent sticking of the iron oxide containing materials and their agglomeration. The bed temperature is preferably maintained at 800°–1000° C. The pre-reduction of the iron oxides is continued until the material has achieved a metallization degree of 30–80 %. The thus reduced material is tapped continuously, and depending on its carbon content it is either conveyed directly to the final reduction, or if the carbon content is too high for the final reduction, it is first cooled below the curie point and then separated magnetically in one fraction mostly and containing prereduced material which is transferred to the final reduction and one fraction mostly containing carbonaceous material which is either recirculated to the fluid bed or used as fuel in the thermal power station. According to the invention the material containing iron oxides passes the pre-reduction unit, to which carbonaceous fuel and air or oxygen are supplied separately and controlled, while the exhaust gases from each step passes straight to the thermal power station. The material is thus treated by a cross-current flow. In most cases so far, efforts have been made to exploit the heating and reduction ability of the reduction gases by leading them in counter-current flow to the material through several beds.

Thus, according to the invention no recovery of heat or reduction gas is necessary for the pre-reduction. On the other hand it may be advantageous to preheat the raw materials with additional fuel, for example oil, and make use of the physical heat content of the exhaust gases in the steam generator. Also within the scope of the invention, the air for gasification of the reducing agents and for heat generation can be preheated by the waste heat from the steam generator. The air may be completely or partially replaced by oxygen in order to adjust the gas flow when fluidizing particularly fine-grained material.

When manufacturing crude iron in accordance with the example shown in FIG. 2 it has been found suitable in practice to continue the pre-reduction process to more than 50 % degree of metallization, preferably 60–80 %. The reason for this preferred metallization interval is that the investment cost per ton annual capacity of crude iron for a plant operating in accordance with the method of the invention is within this interval approximately the same as for a blast furnace process (including sintering plant, coking plant and power station for the blast furnace gas) having the same capacity. At higher degrees of metallization the investment cost per ton annual capacity for the method according to the invention will be higher than those for the blast furnace process, because of the ever larger thermal power station. Since capital is always hard to secure the method according to the invention is usually most attractive in said interval where the prime cost of the crude iron is approximately 30 % lower than crude iron produced by the blast furnace process, but the investment per year/ton is the same for the two processes.

As has been described above, it is clear from FIG. 2 that in this case only 27 % of the total energy supplied to the pre-reduction step is found in the pre-reduction product in the form of physically and chemically bound energy. In the two steps of the pre-reduction $0.6 + 3 = 3.6$ kmol Co + $H_2$ was used per kmol Fe in the pre-reduction product. In three reduction steps, for example, connected in countercurrent flow, the theoretical minimum for reduction purposes is about 2.3 kmol Co + $H_2$. The method according to the invention thus requires a larger quantity of reducing agent in order to achieve the same degree of metallization. However, this has permitted the use of simple equipment without having to reuse hot, dusty gases for reduction purposes which in practice causes considerable technical problems, particularly where large reduction units are concerned.

The higher the temperature used for the pre-reduction, the higher will be the reduction speed, but also the risk of sticking between the individual grains of concentrate in the beds, resulting in the formation of large agglomerates. However, solid carbonaceous material present in the fluid bed prevents sticking, so that sufficiently high temperatures can be used.

Lime (and/or limestone) which are required for slag formation in the final reduction, may be added with advantage even before the pre-reduction. A considerable proportion of the sulphur content of the reducing agent will then be bound to the lime and the content of sulphur dioxide in the exhaust gases from the thermal power plant will be reduced. Alternatively, reducing agents having a higher sulphur content can be used for the pre-reduction without the permitted content of sulphur dioxide in the flue gases being exceeded. The possibility of using reducing agents with high contents of sulphur is an important advantage of the method according to the invention as these reducing agents can be obtained at advantageous prices.

The pre-reduced product is finally reduced and smelted in contact with carbonaceous material while heat is being supplied.

In the melt reduction the carbon is mainly oxidized to form carbon monoxide at the temperatures prevailing (>1000° C). For iron and other metals (M) having high affinity to oxygen the reaction $MO_x + xC = xCO + M$ is endothermic and heat must therefore be supplied to the reaction chamber. Theoretically, the greater part of this heat requirement could be covered by complete combustion of the reduction exhaust gases with oxygen gas in the reaction chamber. However, it has been impossible to solve the problem of conveying the heat liberated during the combustion to the reaction zone without re-oxidizing the reduced metal. The many so-called melt-reduction processes known from the literature are proof of this, none of them having found any industrial application.

For example, in the melt-reduction process DORED (Swedish patent No. 205,039) where the reduction takes place in a coke bed, the heat requirement is covered by burning the exhaust gases from the reduction with oxygen gas above the coke bed as well as some of the coke in the bed. In order to transfer the heat from the furnace atmosphere to the melt a substantially horizontal, rapidly rotating furnace is used in this process so that a considerable portion of the heat is transferred to the melt through the lining of the furnace. However, it has been found that because of the high temperature and the oxidizing atmosphere the wear on the furnace lining will be too high for it to be sufficiently durable. Similar results have been experienced when burning carbon monoxide produced during reduction processes with carbon dissolved in the melt.

The problem of the durability of the lining is solved by the method according to the invention because the heat requirement in the final reduction is substantially covered by means of electric heating. The molten metal, slag, coke bed or a combination of two or more of these may thus be the material in which the electrical heat is generated. The exhaust from the final reduction step, consisting primarily of carbon monoxide, is suitably conveyed directly to the thermal power plant, as is the case with the exhaust gases from the pre-reduction step. Here their energy contents (physical + chemical) are utilized for the generation of electric power.

A small proportion of the heat requirement of the final reduction step may be covered by partial combustion of gases from the reduction with oxygen and/or air above the surface of the material in the furnace. However, it has been found that even with a combustion of 30 % of the exhaust gases the wear on the lining is so great that it has a detrimental effect on the economy of the process.

As mentioned above, the final reduction step may, within the scope of the invention, be performed with carbon dissolved in the molten metal or in a glowing coke bed, which may float on the molten phase. Coke is considered to be the solid remnants, consisting primarily of carbon, obtained from heating carbonaceous material in or outside the reduction zone. At a lower reduction degree for the pre-reduced product a coke bed is preferred, since this permits profuse gas emission per surface unit. If a coke bed is used, carbon monoxide produced during the final reduction need not pass through the layer of slag, thus preventing slag foaming.

The coke bed comprises particles having a grain size <10 mm, preferably 1–10 mm, and is maintained by the addition of coke or the solid carbonaceous material contained in the pre-reduced material.

At higher degrees of reduction, corresponding to about 30–80 % metallization, carbon dissolved in the molten metal phase is preferred for the final reduction. In this case it is advisable to add the pre-reduction product while stirring. This can be achieved by means of gas bubbles or electromagnetically. The gas bubbles can be generated in the melt by supplying a small quantity of the reducing agent only (oil and/or coal powder) and/or finely crushed iron oxides, possibly mixed together, below the surface of the crude iron melt. Gas bubbles of carbon monoxide and hydrogen are thus produced by the reduction process, which when rising through the melt provide stirring.

When final reduction in a coke bed is preferred, stirring is important, particularly if the coke is floating on the melt and the electric heat is mainly produced in the molten crude iron and/or the slag. The heat must then be transferred from said layer to the coke layer and this must be done primarily by means of convection — a means of transfer which is strongly promoted by stirring.

Only if the electric heat is primarily produced in the coke layer itself the stirring is of minor importance. However, if the coke bed is floating on the melt a certain amount of stirring may be required in the layer of crude iron and slag for purposes of homogenization.

In the final reduction of pre-reduced iron ore concentrates according to the invention, a crude iron can be produced which contains only carbon as an alloying element and is therefore easier to refine to steel using oxygen gas. The carbon content of the crude iron should be so high that the melt has good fluidity at 1300° C so that, with a certain margin of safety and irrespective of temperature variations in the system, the final reduction can be performed at about 1400° C. If the concentrate contains phosphorus it may be advisable to adjust the basicity and oxidation potential of the slag so that a crude iron is obtained which is poor in phosphorus. At the same time it acquires low silicon content, and consequently more sulphur in the crude iron provided the sulphur from the raw materials is partially bound during the pre-reduction by the addition of lime. The sulphur must be removed from the crude iron by a separate desulphurizing process. During continuous tapping of the crude iron from the final reduction, this desulphurizing process may be carried out by permitting the crude iron to flow in thin streams through molten soda, the sulphur being bound as sodium sulphide. This will not contain any impurities of significance, such as phosphorus and silicon and is therefore suitable for use as make up instead of sodium sulphate in the sulphate pulp industry.

According to the invention the heat requirement during the final reduction is covered by supplying electric heat. This may be supplied in accordance with known principles for electrometallurgical melt and heating furnaces, i.e. by means of arc, induction or resistance heating. At higher degrees of reduction in the pre-reduced material it is suitable to supply the electric energy through the molten metal. This can be performed by inductive heating by means of high and-/or low frequency alternating current. Amongst others, the so-called channel type induction furnace has been found suitable. In this furnace a part-flow of metal is diverted continuously to a refractory channel where the inductive heating is performed by means of low frequency current in an induction loop around the channel, after which the heated metal flows back to the reduction furnace, thus maintaining thermal balance therein.

When performing the method according to the invention the raw material containing iron oxides, the reducing agent(s) and the slag former(s) are suitably supplied continuously, the flow being separately individually controlled. Crude iron and slag may be tapped batch-wize when a certain level has been reached, or continuously. The tapping may be performed using separate tap-holes or slag and metal may be tapped together, in which case separation is performed at a later stage in some suitable way.

The tapped metal is desulphurized, refined, purified and cast according to known methods, either batch-wise or continuously.

Figure 4:
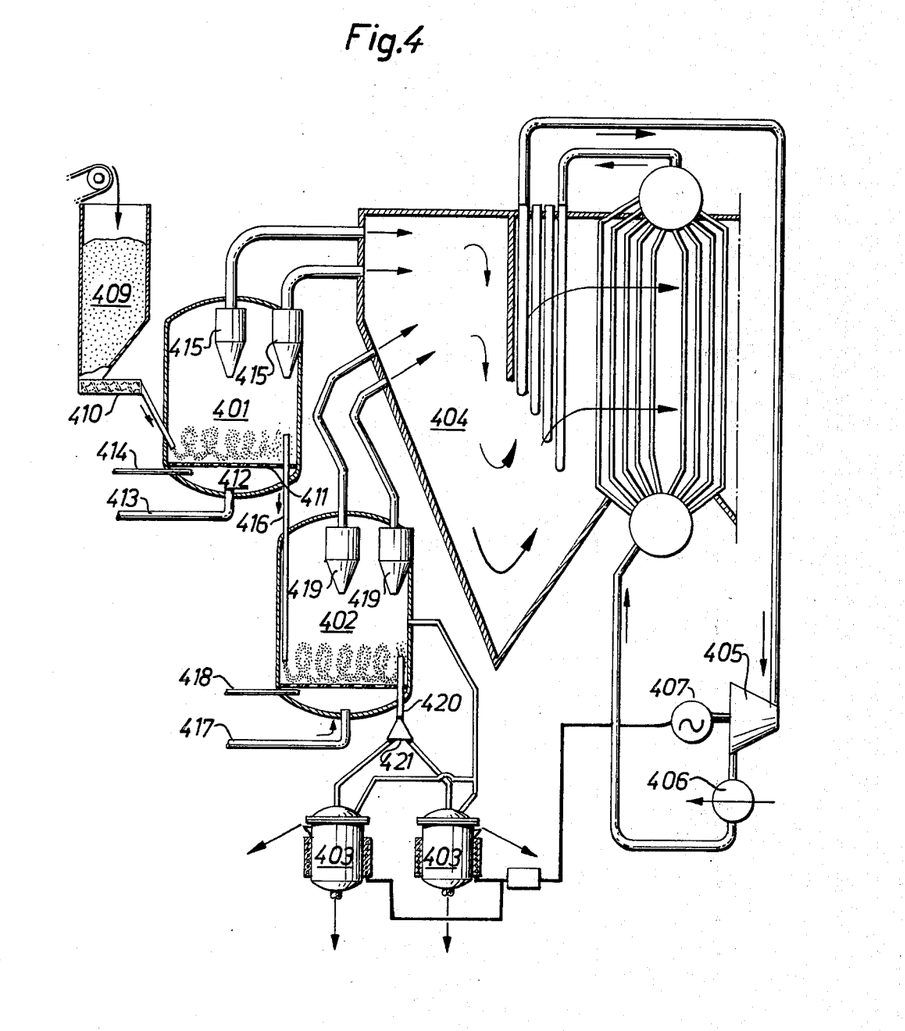
FIGS. 4–5 show examples of various plants for performing the method according to the invention.
Figure 5:
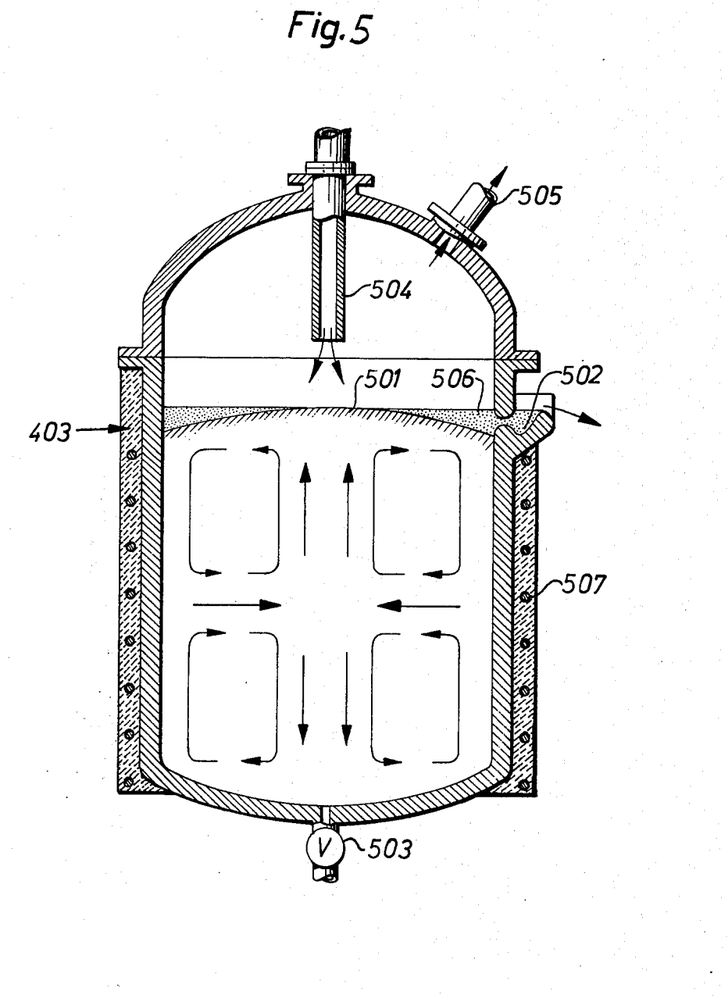

A plant for application of the invention is shown in FIGS. 4 and 5. The plant comprises mainly two pre-reduction furnaces 401, 402, two final reduction furnaces 403, one of which is normally kept in reserve, a steam generator 404 (only partly shown), a steam turbine 405 with a condenser 406 and a generator 407. Iron ore concentrate, and a suitable quantity of coal breeze, in silos 409, is supplied to the pre-reduction furnace 401 by means of suitable feeders 410. The furnace, which operates as a fluid bed, has a perforated bottom 411. The chamber 412 below this bottom is supplied with air pre-heated to 500° C through a conduit 413. The air is suitably pre-heated in a pre-heater of the type having vertically suspended pipes which is built-in to the rear part of the steam generator. Oil is introduced through a conduit 414 to special holes distributed over the perforated bottom 411. The proportion between oil and pre-heated air is controlled so that the volume ratio $$\frac{CO + HO}{CO + H_2}$$

in the exhaust gases from the bed is approximately 1. The quantity of oil and air is adjusted so that the temperature of the bed is maintained at about 850° C. The exhaust gases from the bed are conveyed, after dust removal in cyclones 415, to the steam generator 404 where the remaining energy content is released by combustion with an excess of air.

In the pre-reduction furnace 401 the iron oxide in the concentrate is reduced to mostly wustite. Any coal breeze mixed with the oxide raw material is gasified to coke dust under the conditions prevailing in the furnace 401. Any limestone in the mixture is converted to lime which remains in the mixture of partially reduced iron oxide and the coke in the product from the furnace 401. The product from the furnace 401 is conveyed via a downcomer 416 to the furnace 402. This furnace is designed in the same manner as furnace 401 and operates in the same way with pre-heated air and oil. The proportion between pre-heated air 417 and oil 418 is in this case, however, controlled so that the volume ratio $$\frac{CO + HO}{CO + H_2}$$

in the exhaust gases leaving the bed is 0.25–0.5, while the quantities are adjusted so that the temperature in the bed is maintained at 850° C. After dust removal in cyclones 419, the exhaust gases from the bed are conveyed to the steam generator 404 where the remaining energy content is released by burning with an excess of air.

In the pre-reduction furnace 402 the product from furnace 401 is reduced so that 70 % of the iron content is in the form of metallic iron and the remainder as wustite. The hot, partially metallized product from furnace 402 mixed with coke, and possibly lime, is transferred through a downcomer 420, a distributor 421 and a conduit 422 to the final reduction furnace 403 (= operation 2) which is in the form of a crucible induction furnace energized by net frequency. The furnace contains a melt in two layers; an upper slag layer and a lower layer of molten crude iron with 4 % dissolved carbon. The temperature is maintained at about 1400° C by supplying electric energy to the induction coil 507 surrounding the furnace vessel. Due to the upward current in the molten crude iron, caused by the magnetic field of the induction coil, a hump is formed in the surface 501 of the melt. The slag 506 is hereby moved towards the walls of the vessel and the molten crude iron is exposed over a circular area in the centre of the vessel. Under steady state conditions the slag formed is continuously discharged over a threshold positioned at a suitable level above the bottom of the vessel while the level of the crude iron is kept constant by controlled tapping through a bottom valve 503.

The pre-reduced product from furnace 402 is carried through a pipe 504 in the centre of the lid of the crucible furnace and is directed at a suitable speed (for example by means of an injector driven by gaseous hydrocarbons, not shown in the drawing) substantially perpendicularly to the exposed surface of the crude iron. In this way the pre-reduced product is mixed into the crude iron and its remaining oxide oxygen therein reacts with carbon dissolved in the crude iron. The carbon monoxide thus produced bubbles up to the surface of the melt and is discharged through a pipe 505 and conveyed to the steam generator 404. The solid carbonaceous material contained in the pre-reduced product from furnace 402 is also mixed into the crude iron so that its carbon content is maintained at about 4 %.

Instead of coaking the coal breeze mixed with the oxide raw material in furnace 401, this may, of course, be done in furnace 402. The limestone may be burnt separately, instead of in the furnaces 401 and 402, and mixed during blowing into the crucible furnace.

When blowing in the product from furnace 402 and possibly separately produced coke and lime through the pipe 504 said pipe may also be allowed to penetrate below the surface of the molten crude iron. This results in satisfactory mixing of the melt but causes greater wear on the blowing-in pipe. The inductive stirring in the furnace according to FIG. 5 might also be reversed so that the melt flows downwardly in the centre of the melt carrying along added material.

What we claim is:
1. A method for simultaneous, combined producton of electrical energy and crude iron from carbonaceous material and grained material containing iron oxides comprising
   performing reduction of the iron oxide in two separate operations, pre- and final reduction, the temperature being kept below the melting point of the crude iron during the
   pre-reduction and above said melting point during the final reduction
   introducing carbonaceous material and the material containing iron oxides into a fluidized bed containing solid carbonaceous material, producing reducing gases in the fluidized bed by partial combustion of the carbonaceous material with air/or oxygen gas, pre-reducing the iron oxides by said reducing gases until the material has achieved a metallizaton degree of 30–80 %, most of the heat requirement of the pre-reducton being covered by said combustion
   finally reducing and smelting the product pre-reduced to a metallization degree of 30 to 80 % as defined above in the said pre-reduction operation to produce crude iron by mixing it with molten high-carbon crude iron, and heating electrically said molten high-carbon crude iron so as to substantially cover the heat required for said final reduction
   conveying to a substantial extent the exhaust gases from the reduction operations directly to a thermal power station where the remaining energy contents (physical + chemical) of the gases are used to generate electric energy by utilizing the heat of the gases and by burning the combustible gases.
2. A method according to claim 1, wherein the electrical heat for the final reduction is introduced in the molten metal.
3. A method according to claim 1, wherein the reaction between the metallized product and the carbon in the final reduction is effected by distributing the product over the surface of a glowing bed of coke.

4. A method according to claim 3, wherein the heat transfer from the molten metal to the layer of coke necessary for the final reduction is achieved by stirring by means of electrical induction or bubble stirring the melt to such an extent that the heat is transferred from the melt to the layer of coke.

5. A method according to claim 3, wherein the electrical heat for the final reduction is introduced mainly in the coke layer.

6. A method according to claim 3, wherein the electrical heat for the final reduction is introduced mainly in the molten slag layer.

* * * * *

UNITED STATES PATENT AND TRADEMARK OFFICE
CERTIFICATE OF CORRECTION

PATENT NO. : 3,985,544
DATED : October 12, 1976
INVENTOR(S) : Collin et al.

It is certified that error appears in the above—identified patent and that said Letters Patent are hereby corrected as shown below:

In the Heading, Item [63], replace "October 10, 1972" by --October 20, 1972--.

In Column 1, line 2, replace "October 10, 1972" by --October 20, 1972--.

Signed and Sealed this

Fourteenth Day of December 1976

[SEAL]

Attest:

RUTH C. MASON
*Attesting Officer*

C. MARSHALL DANN
*Commissioner of Patents and Trademarks*